(12) United States Patent
Oh et al.

(10) Patent No.: US 9,061,232 B2
(45) Date of Patent: Jun. 23, 2015

(54) EXHAUST GAS FILTER

(75) Inventors: Kwon-Oh Oh, Seongnam (KR);
Gi-Young Kim, Guri (KR);
Jong-Kwang Kim, Seoul (KR);
Woo-Joo Jeon, Seoul (KR)

(73) Assignee: ALANTUM, Seongnam (KR)

( * ) Notice: Subject to any disclaimer, the term of this patent is extended or adjusted under 35 U.S.C. 154(b) by 505 days.

(21) Appl. No.: 13/512,917

(22) PCT Filed: Dec. 3, 2010

(86) PCT No.: PCT/KR2010/008610
§ 371 (c)(1),
(2), (4) Date: May 31, 2012

(87) PCT Pub. No.: WO2011/068376
PCT Pub. Date: Jun. 9, 2011

(65) Prior Publication Data
US 2012/0240560 A1 Sep. 27, 2012

(30) Foreign Application Priority Data

Dec. 4, 2009 (KR) .................. 10-2009-0119832

(51) Int. Cl.
*F01N 3/02* (2006.01)
*B01D 46/24* (2006.01)
(Continued)

(52) U.S. Cl.
CPC ........ *B01D 46/2403* (2013.01); *B01D 46/0087* (2013.01); *B01D 53/94* (2013.01);
(Continued)

(58) Field of Classification Search
CPC ........... B01D 46/0087; B01D 46/2403; B01D 53/94; B01D 53/944; F01N 3/0217
USPC .................................................. 60/287, 311
See application file for complete search history.

(56) References Cited

U.S. PATENT DOCUMENTS

| 4,478,618 A | 10/1984 | Bly |
| 5,426,936 A | 6/1995 | Levendis |
| 2006/0027510 A1* | 2/2006 | Rassinger ..................... 210/790 |

FOREIGN PATENT DOCUMENTS

| CN | 1594849 | 3/2005 |
| CN | 1619119 | 5/2005 |
| CN | 1629458 | 6/2005 |
| CN | 1681599 | 10/2005 |

(Continued)

OTHER PUBLICATIONS

Chinese Patent Office, Search Report dated May 29, 2013, which was attached to the Office Action dated Jun. 8, 2013, of the corresponding application (Chinese Patent Application No. 201080007033.9).

*Primary Examiner* — Jason Shanske
(74) *Attorney, Agent, or Firm* — Lexyoume IP Meister, PLLC

(57) ABSTRACT

Provided is an exhaust gas filter, including: an external case connected with an exhaust pipe; a filtering unit provided in the external case; a filtering path supplying exhaust gas to the filtering unit; and a pressure relief flange provided in the external case to discharge exhaust gas by bypassing the filtering unit.

According to an exemplary embodiment of the present invention, an exhaust gas filter can prevent the exhaust gas filter from being broken by circuitously discharging exhaust gas even when particular matters collected in the exhaust gas filter increase and thus, pressure in the exhaust gas filter excessively increases Further, engine components such as an EGR, a turbocharger, and the like can be prevented from being broken or outputs thereof can be prevented from deteriorating.

16 Claims, 13 Drawing Sheets

(51) Int. Cl.
  *B01D 46/00* (2006.01)
  *F01N 3/021* (2006.01)
  *B01D 53/94* (2006.01)

(52) U.S. Cl.
  CPC ........ *B01D 53/944* (2013.01); *B01D 2257/404* (2013.01); *B01D 2273/10* (2013.01); *B01D 2279/30* (2013.01); *F01N 3/0217* (2013.01); *Y02T 10/20* (2013.01); *Y02T 10/22* (2013.01)

(56) References Cited

FOREIGN PATENT DOCUMENTS

| | | | |
|---|---|---|---|
| CN | 101165323 | | 4/2008 |
| GB | 2374817 | | 10/2002 |
| JP | 08-173714 | | 7/1996 |
| JP | 2008-508991 | | 3/2008 |
| KR | 20-1999-0040388 | | 11/1999 |
| KR | 10-0307784 | | 8/2001 |
| KR | 100804142 | * | 2/2008 |
| WO | 2007/025959 | | 3/2007 |

* cited by examiner

EXHAUST GAS FILTER

CROSS-REFERENCE TO RELATED APPLICATION

This application claims priority to and the benefit of Korean Patent Application No. 10-2009-0119832 filed in the Korean Intellectual Property Office on Dec. 4, 2009, the entire contents of which are incorporated herein by reference.

BACKGROUND OF THE INVENTION (a) Field of the Invention

The present invention relates to an exhaust gas filter, and more particularly, to an exhaust gas filter capable of preventing the exhaust gas filter from being broken by circuitously discharging exhaust gas when particular matters collected in the exhaust gas filter increase and thus, pressure in the exhaust gas filter excessively increases.

(b) Description of the Related Art

Exhaust gas discharged by combustion of an internal combustion engine includes a variety of harmful substances such as nitrogen oxide (NOx), carbon dioxide, ass, and the like. Apparatuses and methods for removing the harmful substances have been contrived.

In particular, in a diesel engine vehicle, a particular matter is removed by using an exhaust gas filter or a postprocessing apparatus such as a diesel particular filter (DPF), a diesel oxidation catalyst (DOC), and the like.

Figure 13:
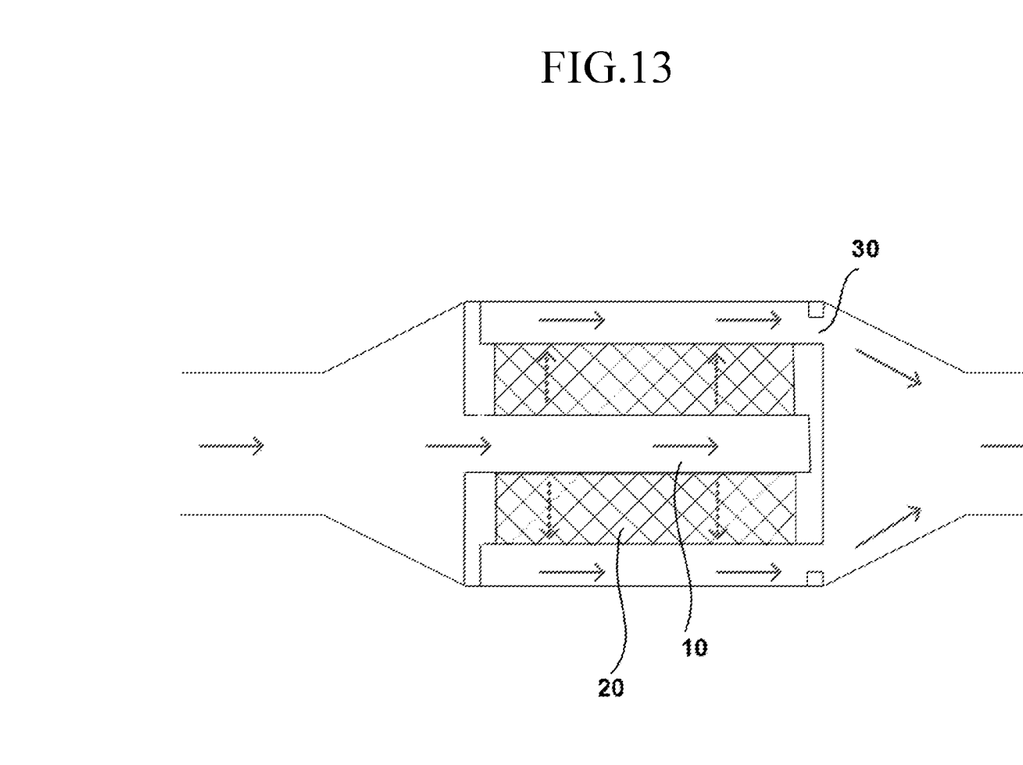
FIG. 13 is a schematic diagram illustrating a general exhaust gas filter.

FIG. 13 is a schematic diagram illustrating a general exhaust gas filter. As illustrated in FIG. 13, the exhaust gas is filtered through a filter medium 20 surrounding the outer periphery of a porous tube 10. The filtered exhaust gas is discharged to the outside through an exhaust gas passage 30.

However, when the exhaust gas filter is used for a long time, pressure in the filter is raised due to excessive collection of the particular matters, thereby causing the filter to be broken or the performance of an engine to deteriorate.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an exhaust gas filter capable of preventing the exhaust gas filter from being broken by circuitously discharging exhaust gas when particular matters collected in the exhaust gas filter increase and thus, pressure in the exhaust gas filter excessively increases.

An exemplary embodiment of the present invention provides an exhaust gas filter, including: an external case connected with an exhaust pipe; a filtering unit provided in the external case; a filtering path supplying exhaust gas to the filtering unit; and a pressure relief flange provided in the external case to discharge exhaust gas by bypassing the filtering unit.

The filtering unit may include: a porous tube provide in the longitudinal direction of the external case; a filter medium provided in the outer peripheral direction of the porous tube; a first flange provided at one end of the longitudinal direction of the porous tube; and a second flange provided at the other end of the longitudinal direction of the porous tube.

The plurality of filter media having a cylindrical shape may be provided in the longitudinal direction of the porous tube.

The filter medium may be provided as a plurality of layers around the porous tube.

The exhaust gas filter may further include a jacket provided to cover the filter medium.

The filter medium may contain at least one of materials selected from a group including a diesel particular filter (DPF) for removing diesel particular matters, a diesel oxidation catalyst (DOC), a selective catalytic reduction (SCR), a lean NOx trap (LNT), and a three way catalyst.

An exhaust gas relief path may be formed inside the pressure relief flange to discharge exhaust gas in the filtering path by bypassing the filtering unit.

The pressure relief flange may include a first plate and a second plate that are attached to each other and the exhaust gas relief path may be formed on at least one of the first plate and the second plate.

The exhaust gas relief path may include a first line opened to the inner periphery and the outer periphery of the pressure relief flange; and a second line branched from the first line and opened to the outer periphery of the pressure relief flange.

The pressure relief flange may include a first plate and a second plate that are attached to each other, and the exhaust gas relief path is formed on at least one of the first plate and the second plate.

The exhaust gas relief path may be formed linearly in a radiation direction inside the pressure relief flange.

The exhaust gas relief path may be formed curvedly in the radiation direction inside the pressure relief flange.

The pressure relief flange may include a front pressure relief flange provided between the first flange and the filter medium.

The pressure relief flange may further include a rear pressure relief flange provided between the second flange and the filter medium.

The pressure relief flange may include a middle pressure relief flange provided between the filter media.

According to an exemplary embodiment of the present invention, an exhaust gas filter can prevent the exhaust gas filter from being broken by circuitously discharging exhaust gas even when particular matters collected in the exhaust gas filter increase and thus, pressure in the exhaust gas filter excessively increases. Further, engine components (an EGR, a turbocharger, and the like) can be prevented from being broken or outputs thereof can be prevented from deteriorating.

DETAILED DESCRIPTION OF THE EMBODIMENTS

An exemplary embodiment of the present invention will hereinafter be described in detail with reference to the accompanying drawings.

Figure 1:
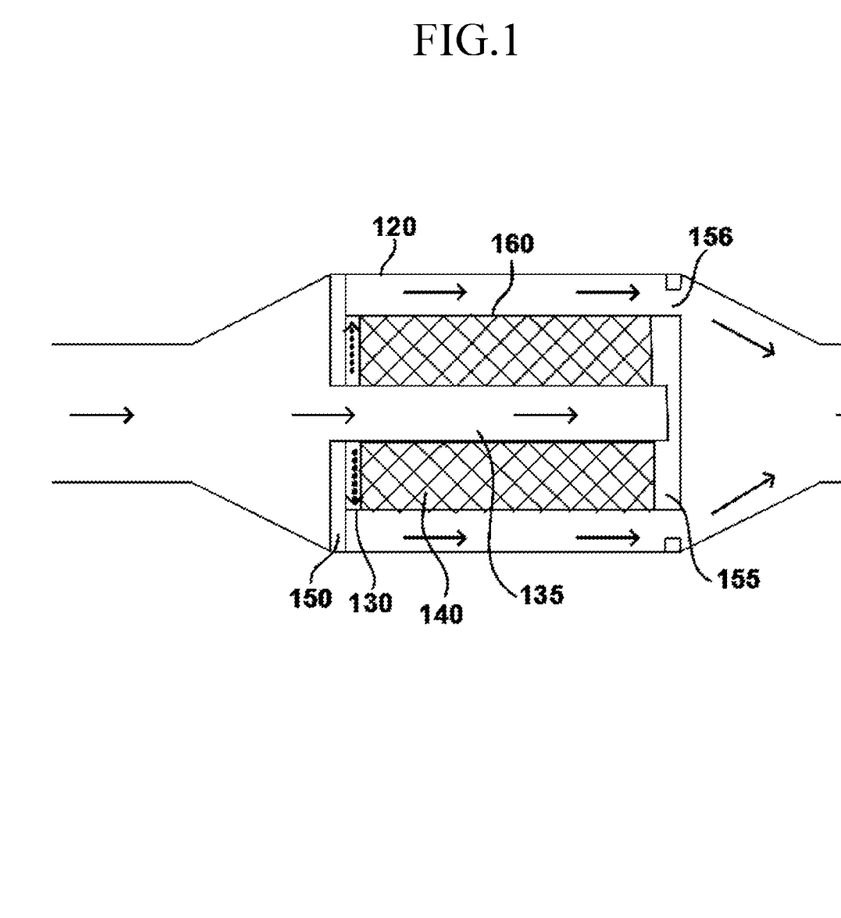
FIG. 1 is a cross-sectional view of an exhaust gas filter according to a first exemplary embodiment of the present invention.
Figure 2A:
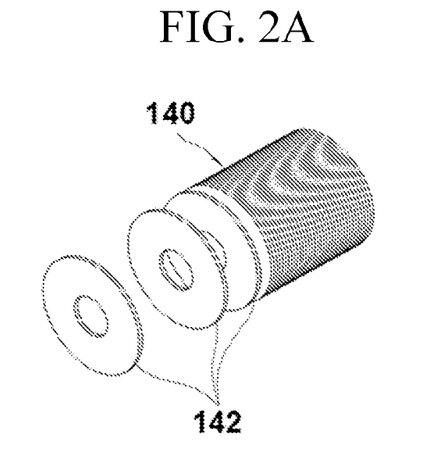
FIGS. 2A and 2B are perspective views of two embodiments of a filter medium of the exhaust gas filter according to the first exemplary embodiment of the present invention.
Figure 2B:
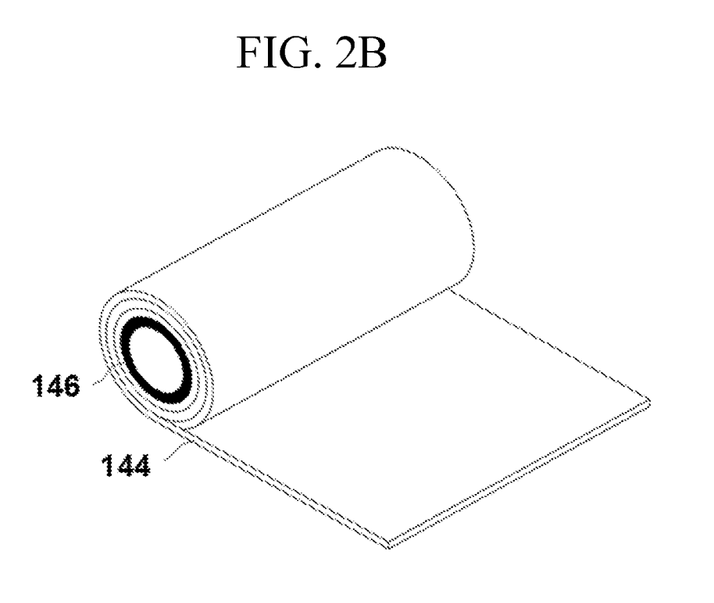
Figure 3:
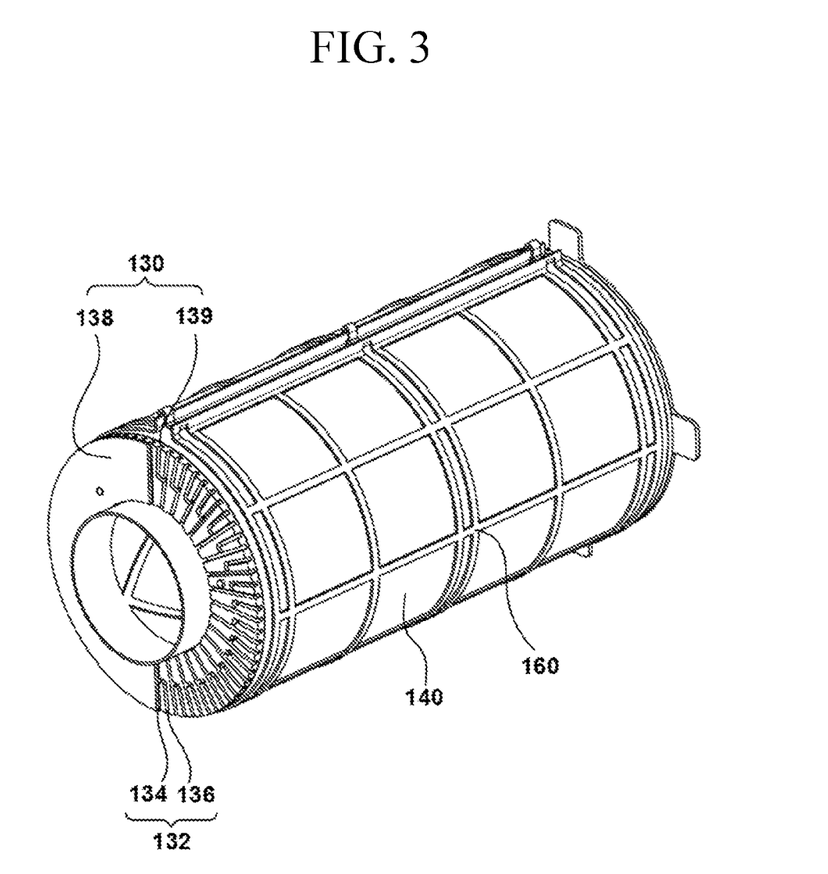
FIGS. 3 to 5 are perspective views of a filtering unit of the exhaust gas filter according to the first exemplary embodiment of the present invention.
Figure 4:
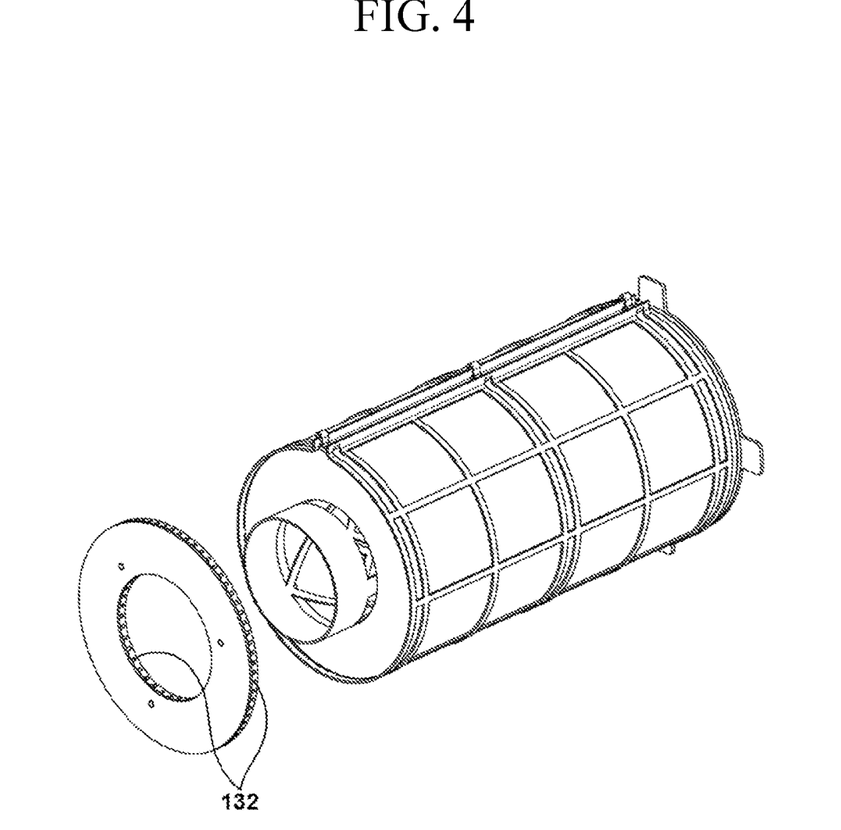
Figure 5:
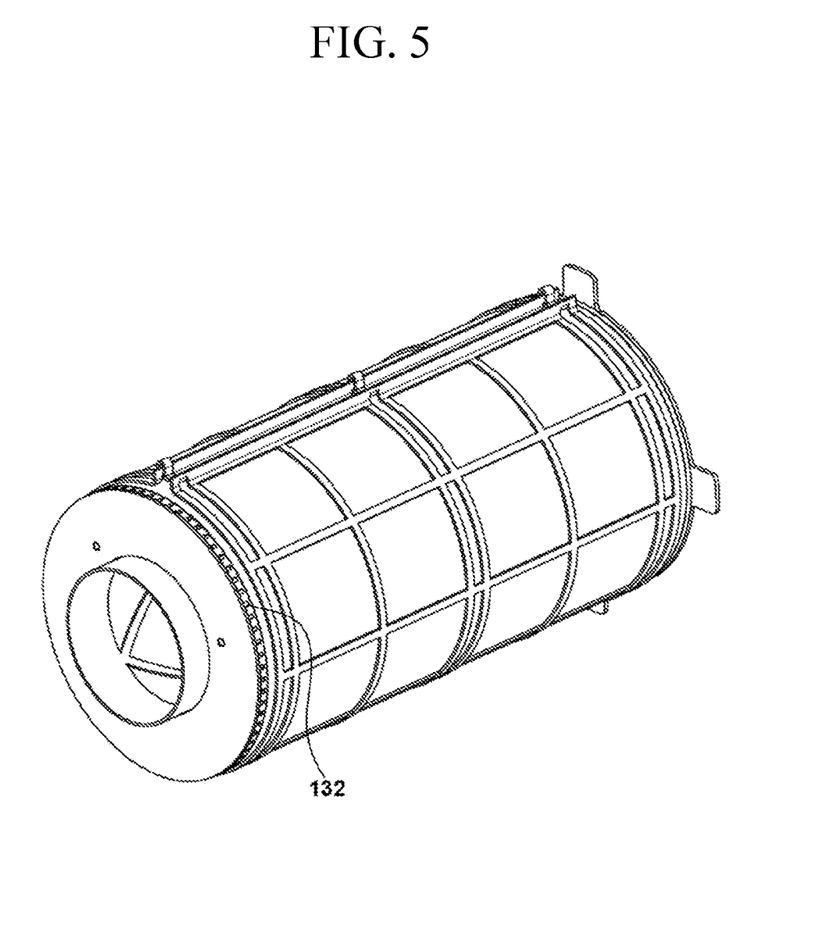

FIG. 1 is a cross-sectional view of an exhaust gas filter according to a first exemplary embodiment of the present invention and FIG. 2 is a perspective view of a filter medium of the exhaust gas filter according to the first exemplary embodiment of the present invention. FIGS. 3 to 5 are perspective views of a filtering unit of the exhaust gas filter according to the first exemplary embodiment of the present invention.

A configuration of the exhaust gas filter according to the first exemplary embodiment of the present invention will be described with reference to FIGS. 1 to 5.

The exhaust gas filter according to the first exemplary embodiment of the present invention includes an external case 120 connected with an exhaust pipe, a filtering unit provided in the external case 120, and a front pressure relief flange 130 provided in the external case 120 to discharge exhaust gas by bypassing the filtering unit.

The filtering unit includes a porous tube 135 provided in the longitudinal direction of the external case 120, a filter medium 140 provided in the outer peripheral direction of the porous tube 135, a first flange 150 provided at one end of the longitudinal direction of the porous tube 135, a second flange 155 provided at the other end of the longitudinal direction of the porous tube 135, and a jacket 160 covering the filter medium 140.

The jacket 160 may be provided to connect the first flange 150 and the second flange 155.

An exhaust gas passage 156 is formed in the second flange 155.

The porous tube 135 and the jacket 160 support the filter medium 140 and have a plurality of holes to allow exhaust gas to flow into the filter medium 140 and are made of a material which is resistant to thermal shock.

A filtering path in the first exemplary embodiment of the present invention is defined by the inside of the porous tube 135 and a space crossing the filter medium 140 in the porous tube 135.

A sealing mat (not illustrated) is provided between the first and second flanges 150 and 155 and the filter medium 140 to prevent exhaust gas from leaking.

The filter medium 140 may be formed by a plurality of cylindrical filters 142 that are provided in the longitudinal direction of the porous tube 135 as illustrated in FIG. 2(a).

Referring to FIG. 2(b), the filter medium 140 may be formed by filters 144 and 146 formed as a plurality of layers around the porous tube 135.

The filter medium 140 may be made of SiC, Cordierite, AT, SiN, and the like which are ceramic materials or made of foil type, foam type, wire mesh type, metal fiber, and the like which are metallic materials.

The filter medium 140 may contain at least one of materials selected from a group including a diesel particular filter (DPF), a diesel oxidation catalyst (DOC), a selective catalytic reduction (SCR), a lean NOx trap (LNT), and a three way catalyst.

That is, different types of filters as the filter medium 140 are stacked in sequence to simultaneously filter a variety of harmful substances such as nitrogen oxide (NOx), carbon dioxide, ass, and the like contained in exhaust gas and further, to save a space, improve filtering efficiency, and reduce a production cost as compared with a case in which the DPF, the DOC, and the three way catalyst are separately installed.

The front pressure relief flange 130 is provided between the first flange 150 and the filter medium 140.

Further, the front pressure relief flange 130 is in contact with one side of the porous tube 135 and an exhaust gas relief path 132 is formed inside the front pressure relief flange 130. The exhaust gas relief path 132 is in communication with the exhaust gas passage 156 of the second flange 155.

The exhaust gas relief path 132 includes a first line 134 and a second line 136.

The first line 134 is opened to the inner periphery and the outer periphery of the front pressure relief flange 130.

The second line 136 is branched at one side of the first bypass 134 and opened to the outer periphery of the front pressure relief flange 130.

When no particular matter (PM) is deposited on the filter medium 140, the exhaust gas is filtered through the filter body 140 and when the particular matters (PM) are deposited on the filter body 140 and thus the filter medium 140 is clogged, the exhaust gas is discharged through the front pressure relief flange 130 to release the pressure of the filtering path.

Meanwhile, the front pressure relief flange 130 includes a first plate 138 and a second plate 139 that are attached to each other. The exhaust gas relief path 132 is formed on at least one of the first plate 138 and the second plate 139. For example, both surfaces of the first plate 138 are flat and the exhaust gas relief path 132 may be formed on one surface of the second plate 139. In this case, the first plate 138 and the second plate 139 are attached to each other to form the front pressure relief flange 130.

Referring back to FIG. 1, an operating principle of the exhaust gas filter according to the first exemplary embodiment of the present invention will be described.

In a normal operating state, exhaust gas is discharged through an exhaust pipe (not illustrated), the porous tube 130, the filter medium 140, and the exhaust gas passage 156 and only a small amount of exhaust gas passes through the exhaust gas relief path 132.

However, when the particular matters (PM) are excessively accumulated in the filter medium 140, the pressure of the exhaust gas filter is significantly increased. In this case, some of exhaust gas cannot flow into the filter medium 140. The exhaust gas that cannot flow into the filter medium 140 flows out to the outside through the exhaust gas relief path 132 and the exhaust gas passage 156.

As such, when the particular matters (PM) are excessively accumulated and the pressure of the exhaust gas filter is excessively increased, the exhaust gas filter according to the first exemplary embodiment of the present invention bypasses the exhaust gas to prevent the exhaust gas filter from being broken.

Figure 6:
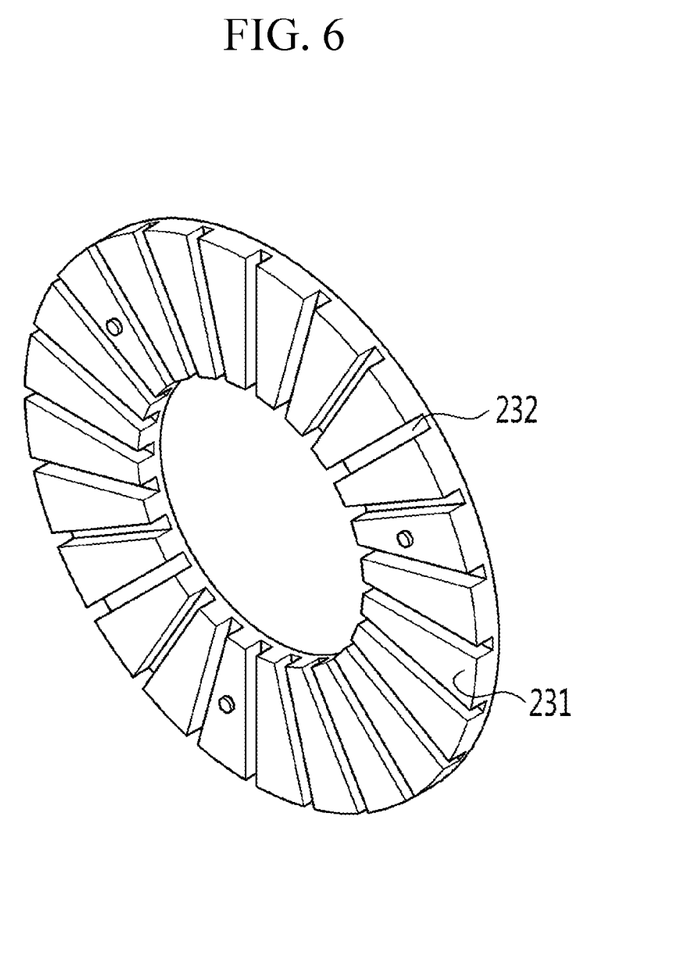
FIGS. 6 to 7 are diagrams of a modified example of the exhaust gas filter according to the first exemplary embodiment of the present invention.
Figure 7:
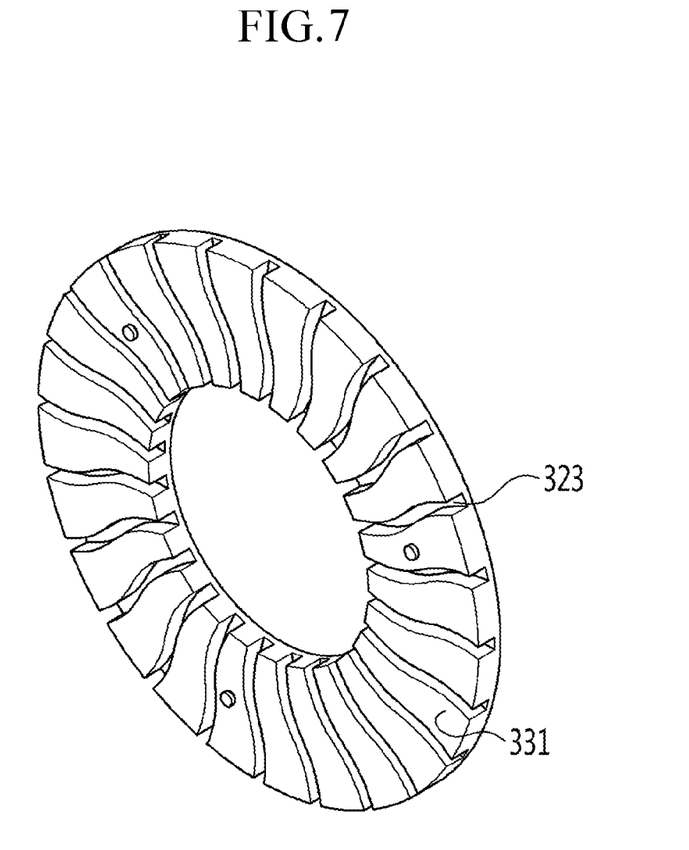

FIGS. 6 to 7 are diagrams of a modified example of the exhaust gas filter according to the first exemplary embodiment of the present invention.

Referring to FIGS. 6 and 7, the modified example of the exhaust gas filter according to the first exemplary embodiment of the present invention will be described.

In the modified example of the exhaust gas filter according to the first exemplary embodiment of the present invention, an exhaust gas relief path 232 may be formed inside a pressure relief flange 231 linearly in a radiation direction.

Further, in another modified example of the exhaust gas filter according to the first exemplary embodiment of the present invention, an exhaust gas relief path 332 may be formed inside a pressure relief flange 331 curvedly in the radiation direction.

Shapes of the exhaust gas relief paths 232 and 332 formed on the pressure relief flanges 231 and 331 are not limited to shapes illustrated in the figures and may include various modified examples to release excessive exhaust gas pressure in the filtering path.

Figure 8:
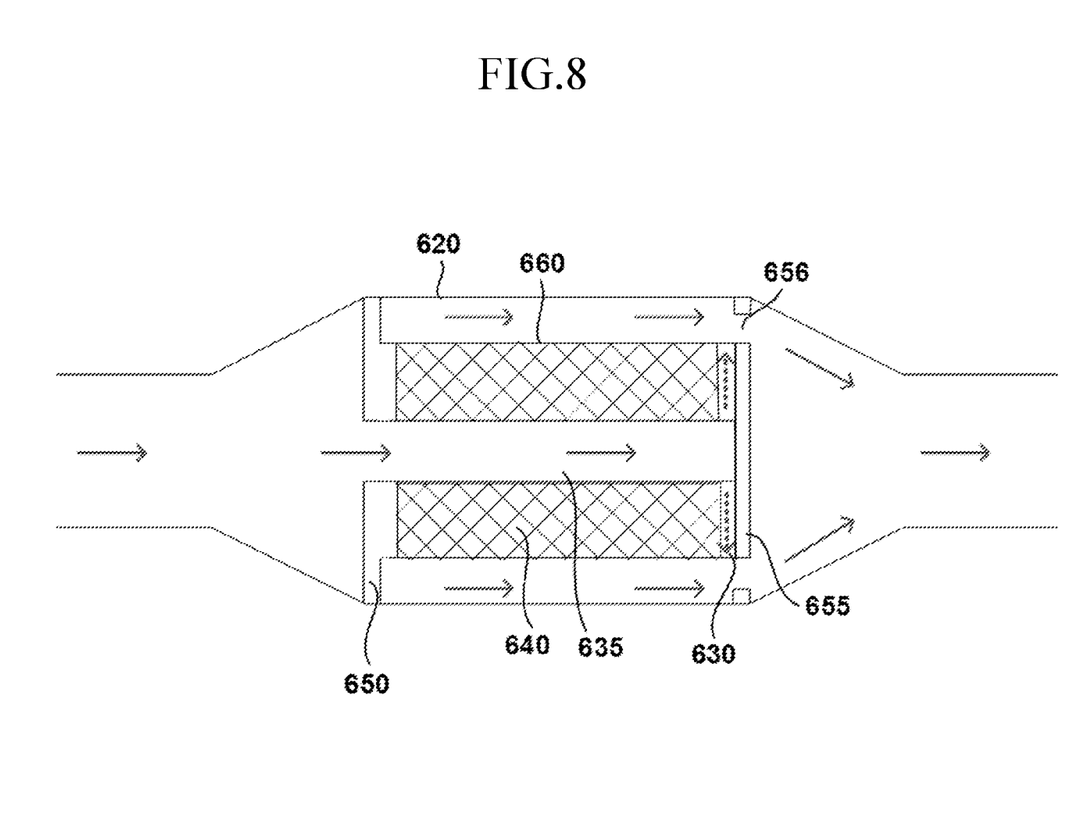
FIG. 8 is a cross-sectional view of an exhaust gas filter according to a second exemplary embodiment of the present invention.

FIG. 8 is a cross-sectional view of an exhaust gas filter according to a second exemplary embodiment of the present invention.

Hereinafter, a configuration of the exhaust gas filter according to the second exemplary embodiment of the present invention will be described with reference to FIG. 8.

The configuration of the exhaust gas filter according to the second exemplary embodiment of the present invention is similar as the configuration of the exhaust gas filter according to the first exemplary embodiment of the present invention and a duplicated description of the same configuration will be omitted.

The exhaust gas filter according to the second exemplary embodiment of the present invention includes an external case 620, a rear pressure relief flange 630, a porous tube 635, a filter medium 640, a first flange 650, a second flange 655, a jacket 660, and an exhaust gas passage 656.

The rear pressure relief flange 630 is provided between the second flange 650 and the porous tube 635.

When the particular matters (PM) are excessively accumulated in the filter medium 640, the pressure of the exhaust gas filter is significantly increased. In this case, some of exhaust gas cannot flow into the filter medium 640. The exhaust gas that cannot flow into the filter medium 640 flows into the rear pressure relief flange 630. The exhaust gas that flows into the rear pressure relief flange 630 flows out to the outside of the rear pressure relief flange 130 through the exhaust gas relief path. The outflow exhaust gas flows out to the outside of the exhaust gas filter through the exhaust gas passage 656.

Figure 9:
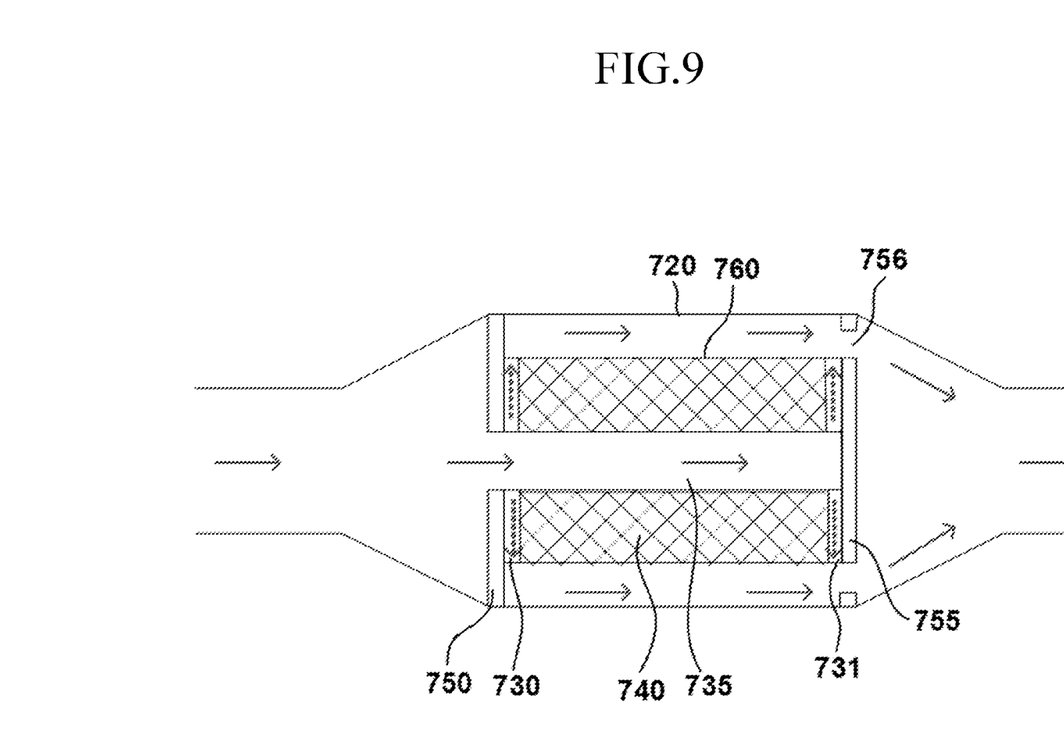
FIG. 9 is a cross-sectional view of an exhaust gas filter according to a third exemplary embodiment of the present invention.

FIG. 9 is a cross-sectional view of an exhaust gas filter according to a third exemplary embodiment of the present invention.

Hereinafter, a configuration of the exhaust gas filter according to the third exemplary embodiment of the present invention will be described with reference to FIG. 9.

The configuration of the exhaust gas filter according to the third exemplary embodiment of the present invention is similar as the configuration of the exhaust gas filter according to the first exemplary embodiment of the present invention and a duplicated description of the same configuration will be omitted.

The exhaust gas filter according to the third exemplary embodiment of the present invention includes an external case 720, a front pressure relief flange 730, a rear pressure relief flange 731, a porous tube 735, a filter medium 740, a first flange 750, a second flange 755, a jacket 760, and an exhaust gas passage 756.

The front pressure relief flange 730 is provided between the first flange 750 and the porous tube 735. The exhaust gas relief path is formed inside the front pressure relief flange 730. The exhaust gas relief path is in communication with the exhaust gas passage 756. The rear pressure relief flange 731 is provided between the second flange 750 and the porous tube 735.

When the particular matters (PM) are excessively accumulated in the filter medium 640 and thus the pressure of the exhaust gas filter is significantly increased, some of exhaust gas flows out to the outside through the front pressure relief flange 730 and the rear pressure relief flange 731.

Figure 10:
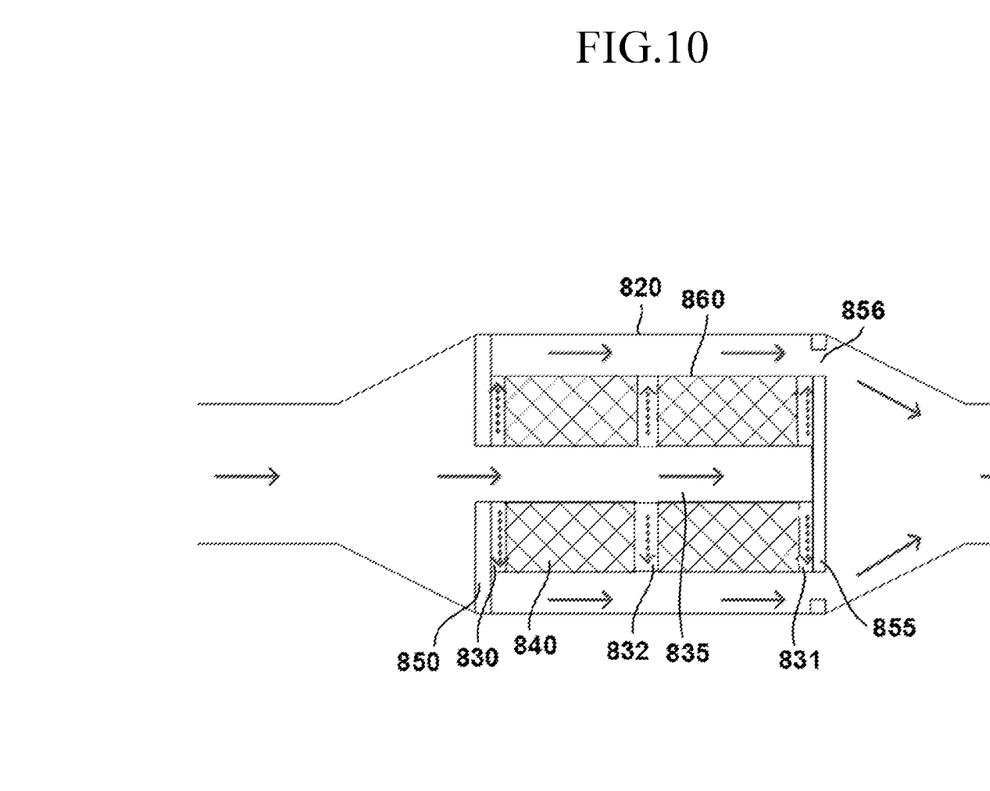
FIG. 10 is a cross-sectional view of an exhaust gas filter according to a fourth exemplary embodiment of the present invention.

FIG. 10 is a cross-sectional view of an exhaust gas filter according to a fourth exemplary embodiment of the present invention.

Hereinafter, a configuration of the exhaust gas filter according to the fourth exemplary embodiment of the present invention will be described with reference to FIG. 10.

The configuration of the exhaust gas filter according to the fourth exemplary embodiment of the present invention is similar as the configuration of the exhaust gas filter according to the third exemplary embodiment of the present invention and a duplicated description of the same configuration will be omitted.

The exhaust gas filter according to the fourth exemplary embodiment of the present invention includes an external case 820, a front pressure relief flange 830, a rear pressure relief flange 831, a middle pressure relief flange 832, a porous tube 835, a filter medium 840, a first flange 850, a second flange 855, a jacket 860, and an exhaust gas passage 856.

The middle pressure relief flange 832 is formed at one side of the longitudinal direction of the filter medium 840. That is, the middle pressure relief flange 832 is provided between the filter media 840. The exhaust gas may bypass even through the middle pressure relief flange 832 in addition to the front and rear pressure relief flanges 830 and 832.

Figure 11:
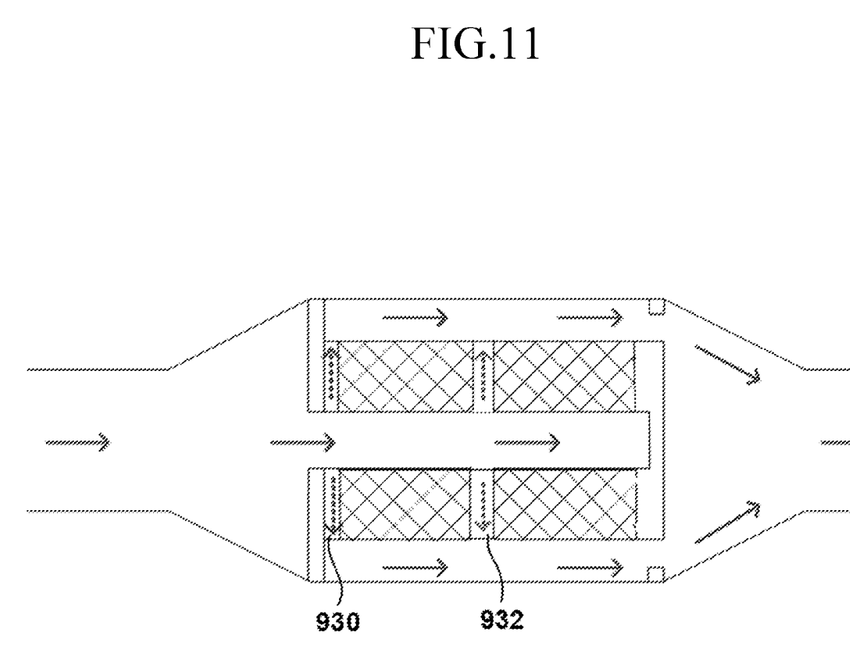
FIG. 11 is a cross-sectional view of an exhaust gas filter according to a fifth exemplary embodiment of the present invention.
Figure 12:
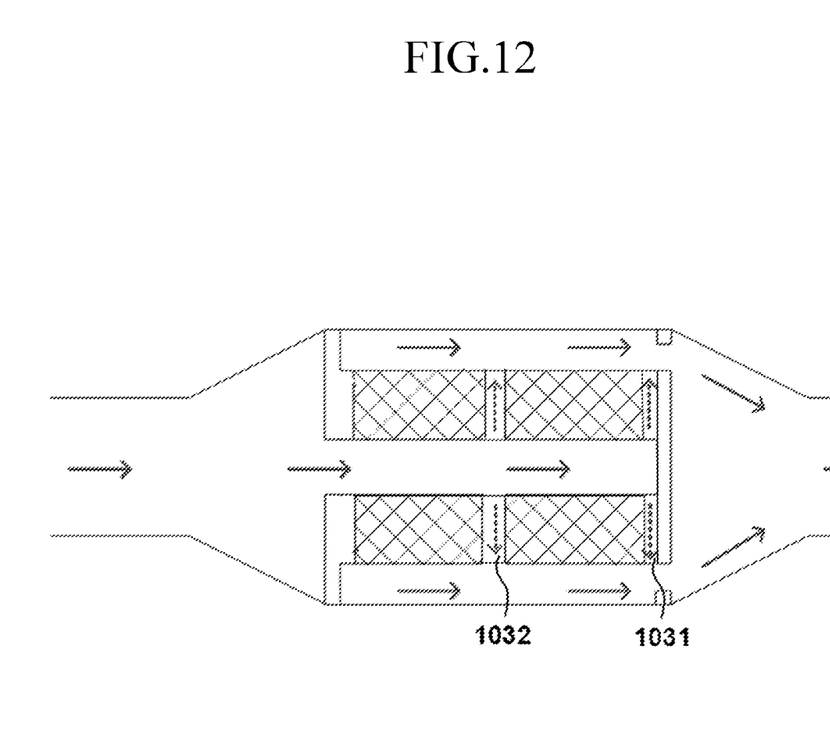
FIG. 12 is a cross-sectional view of an exhaust gas filter according to a sixth exemplary embodiment of the present invention.

FIG. 11 is a cross-sectional view of an exhaust gas filter according to a fifth exemplary embodiment of the present invention and FIG. 12 is a cross-sectional view of an exhaust gas filter according to a sixth exemplary embodiment of the present invention.

The exhaust gas filter according to the fifth exemplary embodiment of the present invention includes a front pressure relief flange 930 and a middle pressure relief flange 932. The exhaust gas filter according to the sixth exemplary embodiment of the present invention includes a rear pressure relief flange 1031 and a middle pressure relief flange 1032. Since the configuration and function of the pressure relief flange are the same as those described in the above exemplary embodiment, a more detailed description thereof will be omitted.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS 120, 620, 720, 820: External case
130, 730, 830, 930: Front pressure relief flange
132, 232, 332: Exhaust gas relief path
155, 630, 731, 831, 1031: Rear pressure relief flange
832, 932, 1032: Middle pressure relief flange
135, 635, 735, 835: Porous tube
140, 640, 740, 840: Filter medium 150, 650, 750, 850: First flange
155, 655, 755, 855: Second flange
156, 656, 756, 856: Exhaust gas passage
160, 660, 760, 860: Jacket

What is claimed is:

1. An exhaust gas filter, comprising:
an external case connected with an exhaust pipe;
a filtering unit provided in the external case;
a filtering path supplying exhaust gas to the filtering unit; and
a pressure relief flange provided in the external case to discharge exhaust gas by bypassing the filtering unit,
wherein:
the filtering unit includes:
a porous tube provided in the longitudinal direction of the external case;
a filter medium provided in the outer peripheral direction of the porous tube;
a first flange provided at one end of the longitudinal direction of the porous tube; and
a second flange provided at the other end of the longitudinal direction of the porous tube.

2. The exhaust gas filter of claim 1, wherein:
the filter medium includes a plurality of filter media having a cylindrical shape provided in the longitudinal direction of the porous tube.

3. The exhaust gas filter of claim 1, wherein:
the filter medium is provided as a plurality of layers around the porous tube.

4. The exhaust gas filter of claim 1, wherein:
the exhaust gas filter further includes
a jacket provided to cover the filter medium.

5. The exhaust gas filter of claim 1, wherein:
the filter medium contains at least one of materials selected from the group consisting of a diesel particular filter (DPF) for removing diesel particular matters, a diesel oxidation catalyst (DOC), a selective catalytic reduction (SCR), a lean NOx trap (LNT), and a three way catalyst.

6. The exhaust gas filter of claim 2, wherein:
the pressure relief flange
includes a front pressure relief flange provided between the first flange and the filter medium.

7. The exhaust gas filter of claim 6, wherein:
the pressure relief flange
further includes a rear pressure relief flange provided between the second flange and the filter medium.

8. The exhaust gas filter of claim 7, wherein:
the pressure relief flange
further includes a middle pressure relief flange provided between the plurality of filter media.

9. The exhaust gas filter of claim 6, wherein:
the pressure relief flange
further includes a middle pressure relief flange provided between the plurality of filter media.

10. The exhaust gas filter of claim 2, wherein:
the pressure relief flange
includes a rear pressure relief flange provided between the second flange and the filter medium.

11. The exhaust gas filter of claim 10, wherein:
the pressure relief flange
further includes a middle pressure relief flange provided between the plurality of filter media.

12. An exhaust gas filter, comprising:
an external case connected with an exhaust pipe;
a filtering unit provided in the external case;
a filtering path supplying exhaust gas to the filtering unit; and
a pressure relief flange provided in the external case to discharge exhaust gas by bypassing the filtering unit,
wherein:
an exhaust gas relief path is formed inside the pressure relief flange to discharge exhaust gas in the filtering path by bypassing the filtering unit,
the pressure relief flange includes a first plate and a second plate that are attached to each other, and
the exhaust gas relief path is formed on at least one of the first plate and the second plate.

13. The exhaust gas filter of claim 12, wherein:
the exhaust gas relief path includes,
a first line opened to an inner periphery and an outer periphery of the pressure relief flange; and
a second line branched from the first line and opened to the outer periphery of the pressure relief flange.

14. The exhaust gas filter of claim 13, wherein:
the pressure relief flange includes a first plate and a second plate that are attached to each other, and
the exhaust gas relief path is formed on at least one of the first plate and the second plate.

15. The exhaust gas filter of claim 12, wherein:
the exhaust gas relief path is formed linearly in a radiation direction inside the pressure relief flange.

16. The exhaust gas filter of claim 12, wherein:
the exhaust gas relief path is formed curvedly in a radiation direction inside the pressure relief flange.

* * * * *